(No Model.)

2 Sheets—Sheet 1.

G. R. ANGELL.
NUMERICAL DIRECTORY INDEX.

No. 552,226.

Patented Dec. 31, 1895.

Fig. 1.

DRAFTS On all the Principal Cities of the U. S. and Europe. Drawn at THE STATE BANK.

| JEW | 160 | JOH |
|---|---|---|
| | | Res. No. |
| XI— Jewett Charles E., real estate, 1st fl. 24 S Carroll, res E Johnson | | 1010 |
| Joachim Edward W., dyer, res N Canal | | 145 |
| JOACHIM GEORGE H., Tonsorial parlor and bath rooms, 2d fl 24 S Carroll. res Clymer | | 416 |
| Joachim John P., clerk Madison Harness Co., res rear S Brooks | | 412 |
| Joachim Julia, (wid Martin), res W Wilson | | 310 |
| Joachim Louis W., clk Ins. Com., res 2d fl S Broom | | 5 |
| Joachim Louisa B., laundress Alford Bros., res W Wilson | | 310 |
| Joachim Theresa, laundress Alford Bros., res W Wilson | | 310 |
| Joachim William, civil engr C. & N. W. R'y, res Baldwin | | 27 |
| VII— Joachim William C., barb G. Joachim, res W Wilson | | 310 |
| Joachim's Block, S Carroll | | 24 |
| Joech Herman, lab Jas. Livesey, res over N Canal | | 19 |
| Johnechik Joseph, mason J. Pickring, bds E Wilson | | 510 |
| Johnsen Andrew, tailor, 3d fl 24 S Carroll, res E Johnson | | 945 |
| Johnsen Bertha, res E Johnson | | 945 |
| Johnsen Carl L., died 1891 | | 12 |
| Johnsen Julius, jeweler J. Larson, res Blair | | 1034 |
| Johnson Anna, res Jenifer | | 1201 |
| Johnson Anna B., dom Rutledge | | |

THE PREMIER TYPE-WRITER At Wm. J. Park & Sons. And full line of Paper and Supplies

| JOH | 161 | JOH |
|---|---|---|
| | | Res. No. |
| Johnson Augusta, cook E Gorham | | 516 |
| Johnson Augusta, res E Mifflin | | 624 |
| Johnson Benjamin, lab, res S Brooks | | 412 |
| Johnson Bernice, res N Park | | 315 |
| Johnson Bordenius, ice peddler Conklin & Sons, res under Blair | | 12 |
| IX— Johnson Carl, coachman E Gorham | | 102 |
| Johnson Carl A., loans, 1st fl 24 S Carroll, res Wisconsin ave | | 316 |
| Johnson Carrie, res W Mifflin | | 215 |
| Johnson Cecelia, res E Mifflin | | 624 |
| Johnson Christine, dom W Gilman | | 18 |
| Johnson Clara, res W Mifflin | | 323 |
| Johnson Frederick, bookkpr., res 3d fl S Broom | | 5 |
| Johnson Frederick, carp J. Cory, res Baldwin | | 27 |
| XIII— Johnson Fred A., photographer, 2d fl 24 S Carroll res E Gorham | | 109 |
| Johnson Gilbert, lab M. H. Ball, res E. Johnson | | 913 |
| Johnson Gilbert L., saloon under 201 E. Main, res E Main | | 304 |
| Johnson Gregor, newsdealer, res S Broom | | 5 |
| Johnson Halvor, carp, res N Canal | | 10 |
| Johnson Hannah, res E Mifflin | | 624 |
| Johnson Henry, engr C. M. & St. P. R'y, res State | | 615 |
| Johnson Hobart S., dentist, 3d fl 24 S Carroll, res Wisconsin ave | | 316 |
| Johnson Ida, student, res E Johnson | | 913 |

WITNESSES:

Jennie Nehms

Grace O'Connell

George R. Angell, INVENTOR

BY

A. Zimmerman, ATTORNEY.

ANDREW B. GRAHAM. PHOTO-LITHO. WASHINGTON. D.C.

(No Model.)

2 Sheets—Sheet 2.

G. R. ANGELL.
NUMERICAL DIRECTORY INDEX.

No. 552,226.

Patented Dec. 31, 1895.

Fig. 2.

Baldwin, $9^{122}$ $17^{208}$ $267$ $27^{161}$
$z^{160}$ $102^{64}$ $106^{228}$ $278$ $108^{62}$
$109^{149}$ $124^{187}$ $214^{110}$ $277$ Bedford, $15^{87}$ Blair, $8^{68}$ $111^{66}$ $12^{160}$ $u^{161}$
$113^{111}$ $142^{19}$ $243$ $17^{236}$ $18^{170}$
$20v$ $22^{298}$ $85$ $23^{165}$ $27^{173}$ $29$
$227$ $108^{240}$ $119$ $164$ $173$ $165$ $198$
$111^{299}$ $112^{139}$ $115^{236}$ $123^{115}$
$126^{149}$ $187$ $162$ $128^{174}$ $201^{178}$
$205^{125}$ $210^{162}$ $211^{48}$ $308^{266}$
$159$ $309^{57}$ $207$ $369$ $233$ $311^{298}$
$312^{264}$ $76$ $316^{108}$ $409^{231}$ Brearly, $403^{256}$ Brooks, N., $209^{61}$ $213^{242}$ $169$
$224^{92}$ $108$ $310^{84}$ $311^{262}$ $362$
$36$ $367$ $138$ $315^{157}$ Brooks, S., $412^{161}$ $r^{160}$ $612$
$77$ $616^{228}$ Broom, N., $12^{124}$ $13^{151}$ $21^{275}$
$290$ $107^{118}$ $92$ $271$ $136$ $111^{280}$
$113^{201}$ $116^{94}$ $157$ $118^{101}$ $121$
$129$ $124^{71}$ $201v$ $206^{216}$ $215$
$212^{303}$ $214^{193}$ $216^{45}$ $218v$
$220^{249}$ $114$ $222^{249}$ $304^{158}$ $173$
$59$ $308^{281}$ $311^{141}$ $312^{252}$ Broom, S, $5$ $xa^{161}$ $b^{160}$ $c^{161}$
$9^{60}$ $11^{187}$ $13^{268}$ $14^{54}$ $17^{228}$
$20^{185}$ $21^{257}$ $68$ $188$ $265$ $112^{80}$
$115^{194}$ Bruen, $13^{244}$ $16^{147}$ $245$ $117^{217}$
$123^{235}$ $124^{113}$ $130^{135}$ $202v$
$222^{137}$ $30^{275}$ $80$ $200$ Buell, $1^{90}$ $264$ Canal, N., $7^{268}$ $10^{161}$ $o^{160}$
$11^{125}$ $254$ $14^{95}$ $24^{238}$ $126$ $25$
$85$ $71$ $220$ $101^{190}$ $105^{167}$ $107$
$176$ $117^{56}$ $185$ $118^{278}$ $122^{247}$
$132^{138}$ $133^{70}$ $157$ $140^{190}$ $141$
$157$ $145^{288}$ $160$ $153^{203}$ Carroll, N., $14^{142}$ $16^{165}$ $18^{151}$
$304$ $235$ $300$ $70$ $204$ $201$ $2^{269}$
$111^{135}$ $115^{46}$ $116^{219}$ $124^{248}$
$61$ $303$ $136^{52}$ $202^{178}$ $293$ $215$
$131$ $216^{305}$ $223^{59}$ $68$ $90$ $180$
$IV^{374}$ $372$ $288$ $224^{217}$ $64$ $303^{28}$ VI Carroll, S., $2^{110}$ $457$ $91$ $6^{287}$ X
V $8^{201}$ $290$ $10^{98}$ $72$ $14^{804}$ $294$
$269$ $16^{116}$ $24^{160}$ $a^{161}$ $160$
XII $b^{161}$ $160$ $c^{160}$ $161$ $26v$ VIII Chandler, $1006^{244}$ $238$ Charter, $110^{101}$ $116^{191}$ $117^{291}$ XIV
$147$ $118^{206}$ $124^{282}$ $127^{273}$ $313$
$361$ $316^{239}$ Clymer, $304^{88}$ $102$ $116$ $211$ $307$
$138$ $317^{139}$ $318^{116}$ $258$ $319^{297}$
$324^{201}$ $325^{128}$ $329^{196}$ $366$ $330$
$62$ $332^{287}$ $335^{276}$ $65$ $336^{131}$
$41^{288}$ $416^{160}$ $275$ $417^{238}$ $132$
$421^{220}$ $430^{103}$ $431^{58}$ $432^{166}$

WITNESSES:

*Jennie Nehm*

*Grace O'Connell*

*George R. Angell*, INVENTOR

BY

*A. Zimmerman*, ATTORNEY.

UNITED STATES PATENT OFFICE.

GEORGE R. ANGELL, OF MADISON, WISCONSIN.

NUMERICAL DIRECTORY-INDEX.

SPECIFICATION forming part of Letters Patent No. 552,226, dated December 31, 1895.

Application filed May 15, 1894. Serial No. 511,345. (No model.)

*To all whom it may concern:*

Be it known that I, GEORGE R. ANGELL, a citizen of the United States, residing at the city of Madison, in the county of Dane and State of Wisconsin, have invented a new and useful Numerical Directory-Index, of which the following is a specification.

My invention is an index to be used in combination with the regular printed pages of a city directory, to show who the occupants are of every house and block in the city cited in such general city directory; also the floor and room in business blocks and other large buildings where occupants are to be found. It is a numerical directory-index to be printed for and used with any city directory, the two to be either combined or bound separately, the said index to be set half-measure or otherwise, and consisting of a grouping together or combination of numbers under an alphabetical arrangement of streets, or a numerical arrangement of streets if the streets are numbered—that is, the streets are to be taken in their alphabetical order, (or in numerical order if numbered,) and after and under the name of each street is cited every number on said street numerically, and after such separate street-number by the use of superior or exponent figures are shown the pages in the general city directory on which the names of occupants or residents at such street-number are to be found, the whole forming one paragraph. On the first directory-page cited in the index after a house-number under a given street the head of the house or the firm-name of a business place or the name of the building (as the case may be) will be found. If more directory-pages are referred to under the same house-number, they follow in the order and are identified in the manner here given—to wit, after each separate house-number will follow the identifying-letters with directory-page as exponent or superior figure—for co-occupants the letter "z," those occupying basements the letter "u," those occupying apartments above the letter "o," those to the rear the letter "r," each followed by the superior or exponent directory page or pages where are to be found their respective roomers and domestics. The floors and flats are designated by the letters "a" "b" "c," &c., to the page cited to represent the first, second, third, &c., floors, and the letter "x" is prefixed to said "a" or first flat in cases where business houses do not occupy the ground floor. All vacant buildings are described by affixing letter "v" to street-number; all vacant floors of buildings by affixing letter "v" to floor-letter, and vacant rooms are shown by an asterisk or similar distinguishing character. Different identifying-letters may be used with the same effect.

The practical application of this index to a city directory is illustrated in the accompanying drawings, in which—

Figure 1 represents two pages of a city directory—to wit, pages 160 and 161. These pages are typical of all the pages in the directory and are only peculiar and different from ordinary city-directory pages in having the residence or house street-number after each name appear at the extreme right of the page in a perpendicular column beneath the words "Res. No." (I). The street-number of the place of business is within the page, following the name when both business and residence numbers are given, (II,) and when there is but one street-number given the number is at the extreme right, (III.) Fig. 2 represents a page of the numerical directory-index, showing the names of streets in alphabetical order with the street-numbers after each street-name in numerical order, and the references by superior or exponent figures to pages of the city directory and references by letters giving the other information, as herein stated.

The manner of using the directory-index with the city directory is illustrated by the pages of the city directory, Fig. 1, and the page of the directory-index, Fig. 2, in the manner following: Joachim's block, for instance, by referring to the city directory, is found on No. 24 South Carroll street, Fig. 1, (III.) By referring to numerical index, South Carroll street is readily found, Fig. 2, (IV,) the streets being in alphabetical order. The house-numbers of the street being numerically arranged, No. 24 South Carroll street is easily found in its numerical position, Fig. 2, (V.) The superior or exponent figure following "24" is "160," Fig. 2, (VI,) the page of the directory upon which is found the name of the head of the house or firm-name of the business place, or, as in this case, the name of the building, Fig. 1, (VII.) Next following in directory-index "$a^{161}$," Fig. 2, (VIII,) gives the information that the name of occupant of room 1, first floor, Joachim's block, will be found on page 161 of the city directory, Fig. 1, (IX,) who can readily be found by looking for No. 24 South Carroll street on that page. Following this in the numerical index we find "$a^{160}$," Fig. 2, (X,) which gives the information that the name of occupant of room 2 on first floor of Joachim's block will be found on page 160 of the city-directory, Fig. 1, (XI,) who can readily be ascertained on this page by the street and number. Following this in the directory-index we find "$b^{161}$," Fig. 2, (XII,) which gives the information as to who is the occupant, Fig. 1, (XIII,) of room 1 on the second floor in this block, and the next superior figure or exponent following, Fig. 2, (XIV,) gives the same information as to the occupant of room 2, second floor, in this block; and so on, citing the rooms in numerical order until each room has been accounted for on said floor.

In collecting the information for the numerical directory-index, the slips of the enumerator are written at the same time as those for the city directory, in order to prepare the index in the minimum time. The slip written at the office or business place would be in the following form: "b—r, 2. 24 S. Carroll, Joachim, George, Barber;" and those written at the residence would be in the form: "416 Clymer, Joachim, George, Barber." Of the latter an entire family-name can generally be represented by one slip, the exceptions being the common names "Smith, Jones," &c., each of which usually take up several pages even in the ordinary city directory. In compiling the slips they are first thrown in alphabetical order according to the name of the person appearing thereon, and when the form-proofs of city directory are being read the folios of the same are filled in on the numerical slips, after which the latter are thrown alphabetically as to street-names or numerically if streets are numbered. Then all streets are assorted separately as to the alphabet. Next the slips are numerically arranged under their respective streets and finally the various floors and rooms on each in their respective blocks are arranged in order.

The numerical directory-index will ordinarily occupy about one page to every thirty-five pages in directories printed full-measure and one page to every eighteen pages in directories printed one-half measure. The index will refer to the names of all occupants of buildings whose names appear in the city directory. The numerical directory-index is further valuable and useful as a correction of errors in the general city directory of duplicate names and wrong numbers.

What I claim, and desire to secure by Letters Patent of the United States, is—

A numerical street index for use in city directories, consisting of an alphabetical list of the streets, each street being followed in large type by the numbers of buildings or houses upon that street, and each number of building being followed by smaller numbers which refer to the page of the directory upon which the names of the occupants of that building are to be found, substantially as shown.

Dated at Madison, Wisconsin, this 12th day of May, A. D. 1894.

GEORGE R. ANGELL.

In presence of—
R. M. LA FOLLETTE,
SADIE STORM.